(No Model.) 3 Sheets—Sheet 1.
W. E. WORTHEN.
APPARATUS FOR SUPPLYING OR REMOVING STORAGE BATTERIES.
No. 517,134. Patented Mar. 27, 1894.
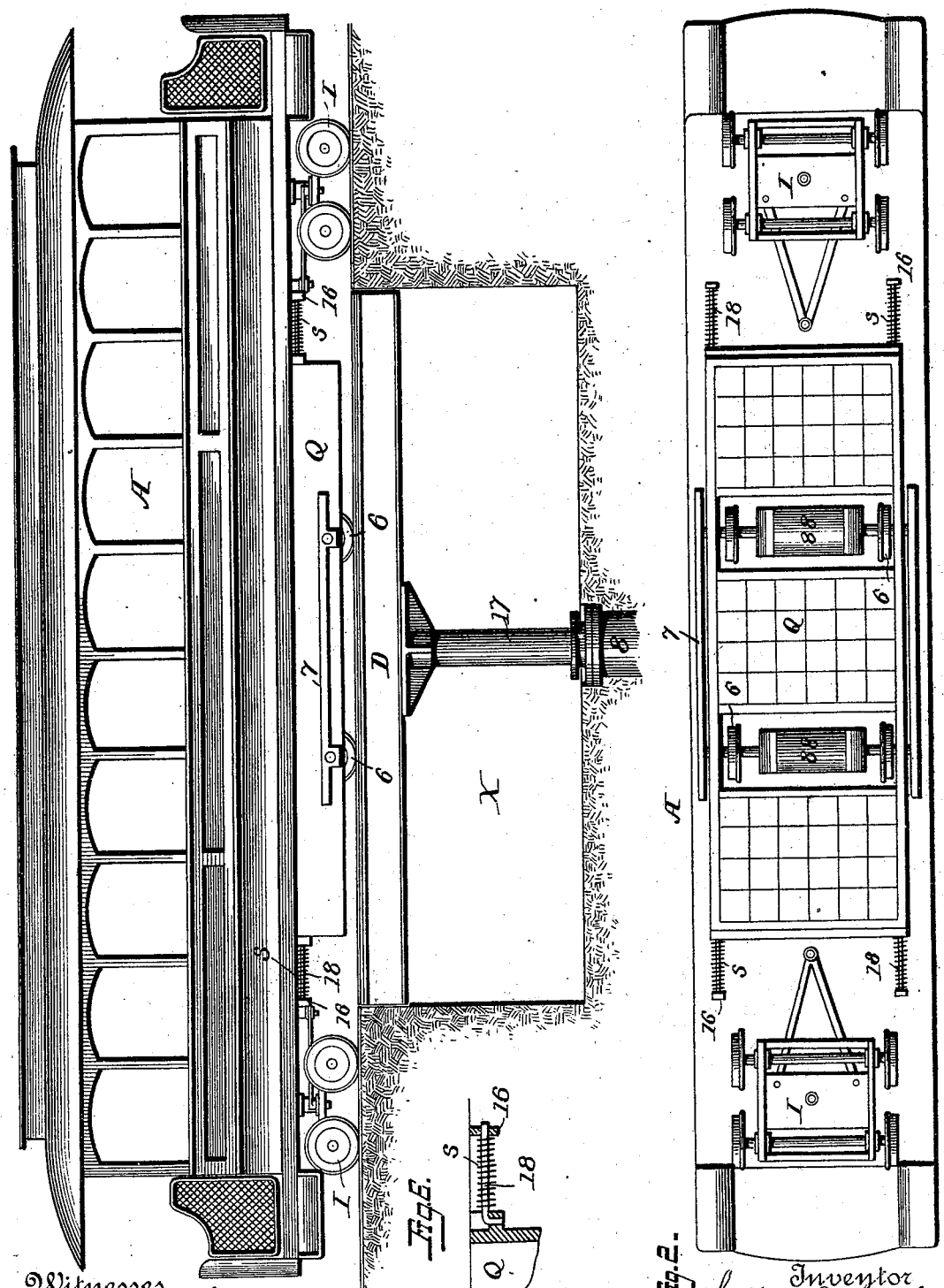

(No Model.) 3 Sheets—Sheet 2.
W. E. WORTHEN.
APPARATUS FOR SUPPLYING OR REMOVING STORAGE BATTERIES.
No. 517,134. Patented Mar. 27, 1894.
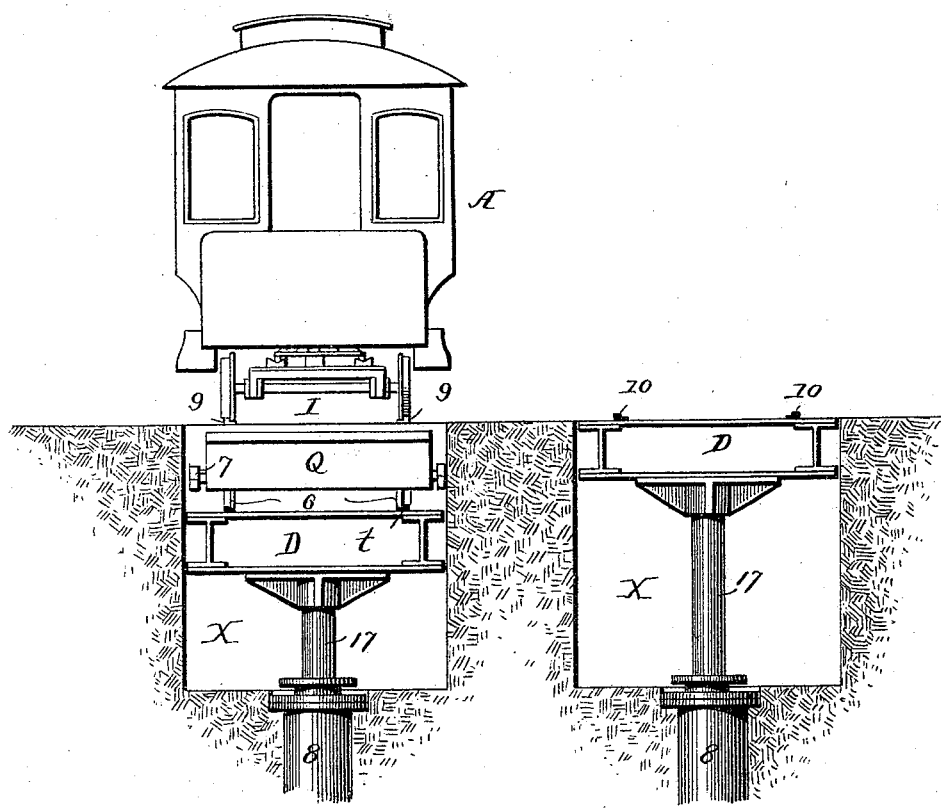

(No Model.)  3 Sheets—Sheet 3.
W. E. WORTHEN.
APPARATUS FOR SUPPLYING OR REMOVING STORAGE BATTERIES.
No. 517,134.  Patented Mar. 27, 1894.
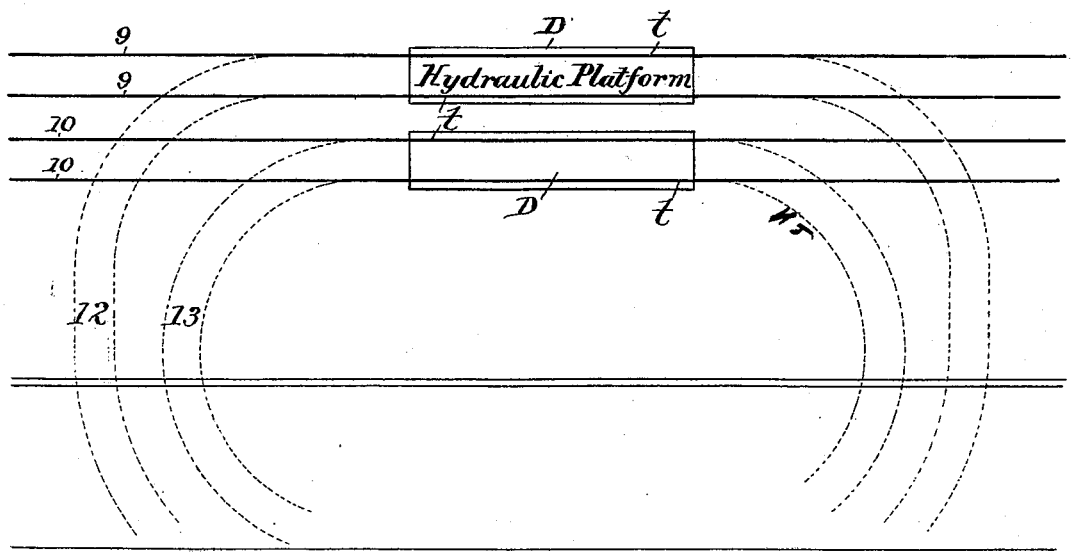
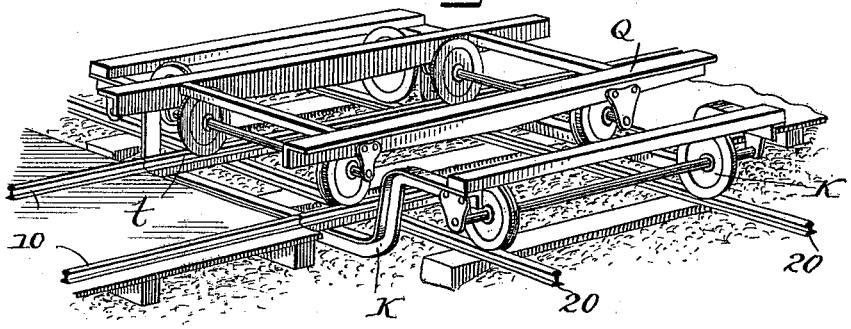

UNITED STATES PATENT OFFICE.

WILLIAM E. WORTHEN, OF NEW YORK, N. Y.

APPARATUS FOR SUPPLYING OR REMOVING STORAGE-BATTERIES.

SPECIFICATION forming part of Letters Patent No. 517,134, dated March 27, 1894.

Application filed August 5, 1893. Serial No. 482,484. (No model.)

*To all whom it may concern:*

Be it known that I, WILLIAM E. WORTHEN, a citizen of the United States, residing in the city, county, and State of New York, have invented certain new and useful Improvements in Apparatus for Supplying or Removing Storage-Batteries, of which the following is a specification.

The object of my invention is to facilitate the application of storage batteries to and their removal from the bodies of railway cars, and to this end, I provide each car with a storage battery and motor or motors supported upon a wheeled truck connected removably to the car, and also provide means whereby the said trucks with their batteries and motors may be readily applied to and removed from the car bodies as fully set forth hereinafter and as illustrated in the accompanying drawings, in which—

Figure 1, represents in side elevation a car, together with a removable platform and a secondary battery truck in accordance with my invention, together with the devices which operate the movable platform as contained within the pit. Fig. 2 is an inverted plan of the car and truck. Fig. 3, is an end elevation of the devices and car as represented in Fig. 1, the earth surrounding the pits being shown in section. Fig. 4 is a plan indicating the arrangement of tracks and platform in connection with the street and storage house. Fig. 5 is a perspective view illustrating a modification. Fig. 6, is a sectional view in detail, representing the means for connecting the battery truck with the trucks of the car.

My improvement may be employed with either single or double track roads, a double track road being shown in Fig. 4 where the two tracks 9, 10, run adjacent to the charging or storing house, and in the line of each track is a platform D containing rails coinciding with those of the track and capable of being elevated to the line of the track to constitute a part thereof or of being depressed within a pit X constituting a part of or leading to the charging house below the street level, and also having two endless tracks 12, 13 which for a part of their distance coincide with those of the main tracks above, so that when either platform D is lowered to a level of the lower track, the rails on the said platform will coincide with and constitute a portion of said track.

Any suitable means may be employed for raising and lowering the platform. As shown, each platform has a plunger 17 adapted to enter a hydraulic cylinder 8 and the discharge of water from which permits the platform and its load, as hereinafter set forth, to descend and upon the pumping of water into the cylinder, the plunger and its platform will be elevated in a manner too well known to require further description.

The bodies A of the cars are constructed in any suitable manner and are provided with trucks I I, the latter being what is known as "Bissell" trucks.

The battery and motor or motors of each car are supported by a battery truck Q. In the construction shown in Figs. 1 and 2, the battery truck for the support of the battery has wheels 6, 6, and a frame 7 that supports motors 88, 88 of suitable construction, and the battery in one, two or more sections is supported in the frame in any suitable manner.

Whatever be the construction, the truck that carries the storage battery is detachable from the car body, and the platform D is of such a length that it will receive the detachable truck and its battery, so that after a car is brought in proper position over a platform D, and the latter is lowered, it will carry with it the storage battery truck from the level of the street to the level of the track 12, or 13 below; and when the platform reaches this level, the truck with its exhausted battery may be run off of the platform and along the lower track to the storage house, and at the same time another truck with a fully charged battery is run on to the platform and is elevated to a position beneath the car and properly connected therewith in any suitable manner.

The truck Q is of course connected flexibly with the car body or frame. This may be done in different ways. As shown it is by a series of rods 18, each hooked detachably to the truck frame 7, extending through an eye in a pivoted stud 16, and surrounded by a coiled spring *s* whereby the truck can first start and then start the car without objectionable jolts.

It will be evident that whenever the truck has to be detached from the car body, it is simply necessary to unhook the ends of the connecting rods 18, after which the truck can descend with the platform, and when another truck is raised in place, it is connected with the car body simply by means of the hooked rods. Of course it will be evident that any suitable connections may be substituted for those shown.

While it may be advisable for many purposes to use the above described method of disconnecting the trucks from the cars, it is not in all cases necessary to do so, as the arrangement shown in Fig. 5 may be employed, where the removable rail section $t$ may be supported by a wheeled carrier K running on tracks 20, 20, extending at a lower level and at right angles to the main track 9, 10. In Fig. 5 I have shown the carrier K in position to receive a truck Q which is then run out into the storage house and another carrier is run back with a battery truck, which is thereby brought into position to connect with the car, from which the first has been removed.

While I have described and illustrated my invention as used with a particular car body having trucks at the ends, it is evident that car bodies without such end trucks may be used. In use the car body may rest entirely upon the storage battery truck, and when the latter is changed the car body may rest with its end frames or struts on suitable supports on the track, or the car body may be raised from the storage battery truck by hydraulic or screw jacks or otherwise.

While the tracks 12 and 13 are described as endless, they may of course be fitted with switches, stalls, &c., similar to the usual tracks in locomotive houses.

Other equivalent arrangements will suggest themselves to those skilled in the art and I do not therefore limit myself to the precise details shown.

Without limiting myself to the precise construction and arrangement of parts shown, I claim as my invention—

1. The combination with a main track and railway car, supported upon wheels, of a battery truck supported upon wheels and supporting a battery and a motor or motors, and connected detachably with the body of the car, a movable track section, and a support for the track section whereby the same with the truck can be moved to and from the body of the car, substantially as set forth.

2. The combination with a railway car and its supporting wheels, of a wheeled truck supporting a secondary battery connected detachably to the body of the car, of a track having a section supported upon a vertically movable platform adapted to receive and carry the battery truck, substantially as set forth.

3. The combination with a track having a section supported upon a vertically movable platform D, of a lower track extending to the storage house, with rails coinciding with those of the platform when it is lowered, and a car provided with a wheeled truck connected detachably to the body and carrying a storage battery, substantially as set forth.

4. The combination of a track, movable platform carrying rails, and a car having a wheeled truck supporting a motor and a storage battery and connected detachably and flexibly with the body of the car, substantially as and for the purpose set forth.

5. The combination in a railway car having Bissell trucks, of a removable battery truck provided with wheels and carrying a storage battery and motor, substantially as set forth.

6. The combination of a car, its supporting wheels, a battery truck having supporting wheels, and spring connections between the battery truck and the car, substantially as described.

In testimony whereof I have signed my name to this specification in the presence of two subscribing witnesses.

WILLIAM E. WORTHEN.

Witnesses:
ROBT. E. HAWLEY,
HERM. RITTER.